(12) United States Patent
Kraft

(10) Patent No.: US 7,961,485 B2
(45) Date of Patent: Jun. 14, 2011

(54) METHOD OF FORMING A PWM CONTROLLER AND STRUCTURE THEREFOR

(75) Inventor: Jonathan P. Kraft, Frederick, CO (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 649 days.

(21) Appl. No.: 11/954,546

(22) Filed: Dec. 12, 2007

(65) Prior Publication Data

US 2009/0153207 A1 Jun. 18, 2009

(51) Int. Cl.
*H02H 7/122* (2006.01)
(52) U.S. Cl. ............... 363/56.1; 361/92; 361/97
(58) Field of Classification Search .......... 363/56.1, 363/56.03, 56.09, 56.11; 361/97, 89, 96, 361/92
See application file for complete search history.

(56) References Cited

U.S. PATENT DOCUMENTS

| | | | | |
|---|---|---|---|---|
| 4,368,500 A | * | 1/1983 | Conroy et al. | 361/94 |
| 5,073,724 A | * | 12/1991 | Fox | 327/74 |
| 7,116,564 B2 | * | 10/2006 | Takahashi | 363/21.16 |
| 2006/0209481 A1 | * | 9/2006 | Kim et al. | 361/92 |

OTHER PUBLICATIONS

Data Sheet, "NCP1271 Mode Standby PWM Controller with Adjustable Skip Level and External Latch", Copyright Jun. 2007—Rev. 4, Semiconductor Components Industries, LLC., 19 pages.
Data Sheet, 'NCP1351 Variable Off Time PWM Controller, Copyright June, 207—Rev. 2, Semiconductor Components Industries, LLC, 25 pages.

* cited by examiner

*Primary Examiner* — Harry Behm
(74) *Attorney, Agent, or Firm* — Robert F. Hightower

(57) ABSTRACT

In one embodiment, a PWM controller is configured to inhibit forming a drive signal responsively to an overload sense signal having a value that is no greater than a first value for a first time interval and to form a first duration of the first time interval responsively to the overload sense signal.

17 Claims, 3 Drawing Sheets

US 7,961,485 B2

METHOD OF FORMING A PWM CONTROLLER AND STRUCTURE THEREFOR

BACKGROUND OF THE INVENTION

The present invention relates, in general, to electronics, and more particularly, to methods of forming semiconductor devices and structure.

In the past, the semiconductor industry utilized various methods and structures to produce pulse width modulated (PWM) power supply controllers. In some cases, the power supply controllers monitored the value of the output voltage to determine if the power supply was delivering too much power to the load. Generally, such controllers would terminate supplying power to the load once the overload condition was detected. Thus, the prior controllers could not efficiently handle small power overloads.

Accordingly, it is desirable to have a PWM controller that more accurately senses a power overload condition, that can regulated power to the load for a greater period of time, and that more efficiently protects the power supply controller.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action. The use of the word approximately or substantially means that a value of an element has a parameter that is expected to be very close to a stated value or position. However, as is well known in the art there are always minor variances that prevent the values or positions from being exactly as stated. It is well established in the art that variances of up to about ten percent (10%) are regarded as reasonable variances from the ideal goal of exactly as described.

DETAILED DESCRIPTION OF THE DRAWINGS

Figure 1:
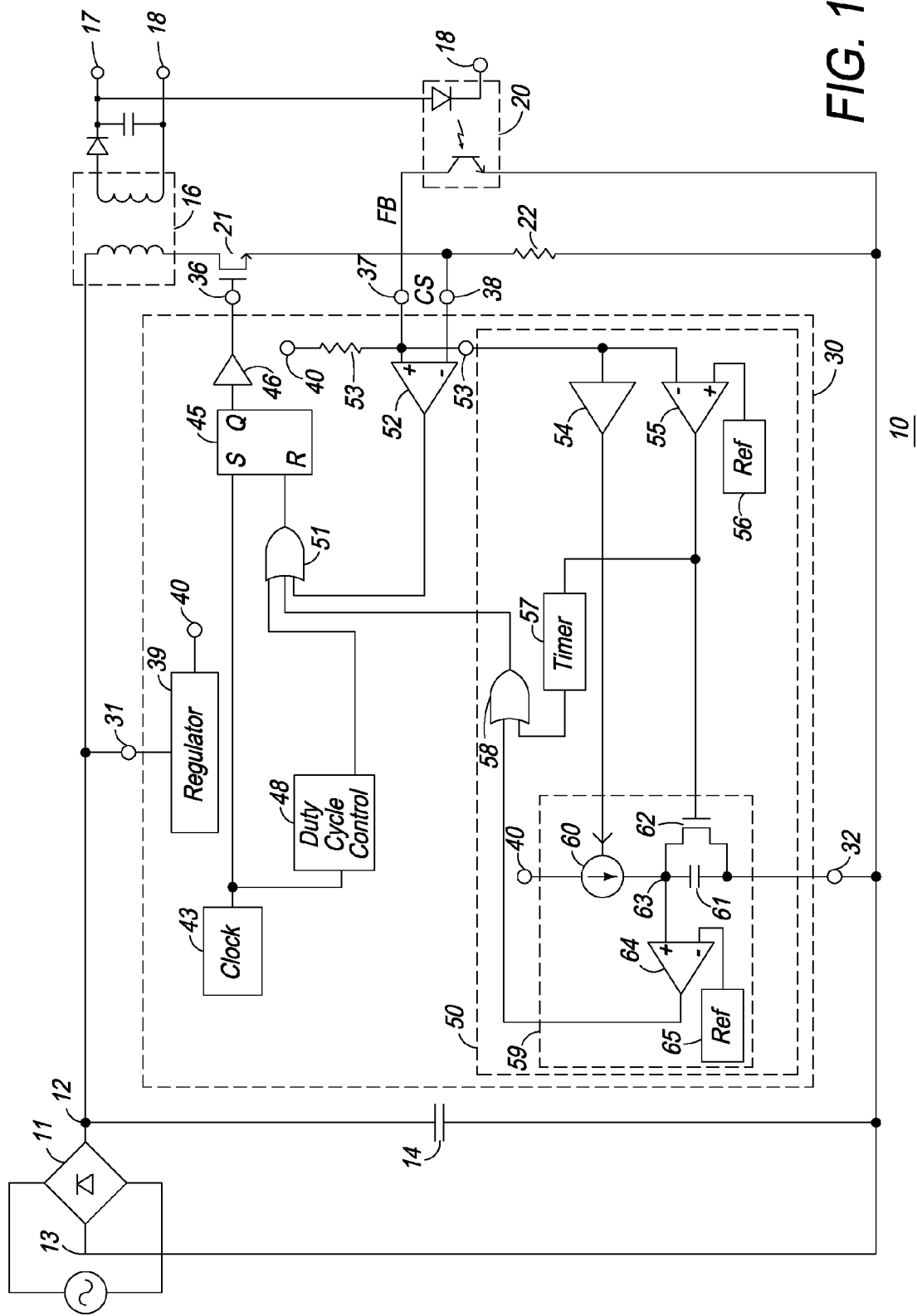
FIG. 1 illustrates an embodiment of a power supply system that schematically illustrates a portion of an exemplary embodiment of a pulse width modulated (PWM) power supply controller in accordance with the present invention.

FIG. 1 schematically illustrates a portion of an embodiment of a power supply system 10 that illustrates a portion of an exemplary embodiment of a pulse width modulated (PWM) power supply controller or PWM controller 30. System 10 receives input power between a power input terminal 12 and a power return terminal 13, and forms an output voltage between an output terminal 17 and an output return 18. A load (not shown) generally is connected between terminal 17 and return 18. Terminals 12 and 13 generally are coupled to receive a bulk input voltage that is formed between terminals 12 and 13 by a bridge rectifier 11. A capacitor 14 provides a filtering function to assist in forming the bulk input voltage. Controller 30 forms a drive signal that is used to control the operation of a power switch, such as a power transistor 21, and regulate the value of the output voltage between terminal 17 and return 18 to a desired value. The output voltage usually is regulated to a target value within a range of values that form the desired value around the target value. For example, the target value may be five volts (5 v) and the range of values of the desired value may be plus or minus five percent (5%) around the five volts. Transistor 21 typically is connected to a transformer 16 in order to control current flow through transformer 16 in order to regulate the output voltage. A feedback network 20 is connected to receive the output voltage and form a feedback (FB) signal that is representative of the output voltage. A current sense circuit, such as a resistor 22, may be coupled to form a current sense (CS) signal that is representative of the value of the current flowing through transistor 21.

As will be seen further hereinafter, controller 30 is configured to sense the value of the output voltage, through the feedback signal, increasing to no less than a first value and to inhibit forming the drive signal responsively to the output voltage being no less than the first value for a first time interval. Controller 30 is connected to receive input power between a voltage input 31 and a voltage return 32. Input 31 and return 32 typically are connected to respective terminals 12 and 13. Controller 30 generally includes a drive output 36, a feedback (FB) input 37, and a current sense (CS) input 38. FB input 37 is connected to receive the FB signal from feedback network 20 and CS input 38 is connected to receive the CS signal that is representative of the current through transistor 21. Drive output 36 provides a switching drive signal or drive signal that is utilized to operate transistor 21 and regulate the output voltage between terminal 17 and return 18 to the desired value.

Controller 30 generally includes a substantially fixed frequency clock circuit or clock 43, a PWM latch 45, a PWM driver or buffer 46, an optional maximum duty cycle control circuit 48, an OR gate 51, and a voltage-current mode comparator 52. Controller 30 also generally includes an internal regulator 39 that is coupled between input 31 and return 32 to receive the input voltage and form an internal operating voltage on an output 40 that is used for operating elements of controller 30 such as latch 45 and gate 51. In some cases, regulator 39 may include a high voltage start-up circuit that forms a low voltage from the high voltage on input 31 and then uses this low voltage to form the operating voltage on output 40. Such start-up circuits and internal regulators are well-known to those skilled in the art. Additionally, in some cases, the high voltage start-up circuit may be connected between input 31 and terminal 12 with the output of the high voltage circuit connected to input 31. Clock 43 forms a substantially fixed frequency clock signal that is used to set latch 45 and initiate a cycle of the drive signal on output 36. Setting latch 45 assert the drive signal which enables transistor 21 and forms the CS signal on input 38 as current begins to flow through transistor 21. Comparator 52 receives the CS and FB signals and the output of comparator 52 goes high when the CS signal reaches the value of the FB signal. The high from comparator 52 resets latch 45 and terminates the active portion of the cycle of the drive signal by negating the drive signal. The duty cycle of the drive signal is determined as the active portion of the drive signal divided by the total period of the drive signal. Maximum duty cycle control circuit 48 is used to limit the maximum duty cycle of the drive signal formed on output 36. Circuit 48 receives the clock signal from clock 43 and forms a control signal at a point in the period of the drive signal where it is desired for the active portion of the drive signal to terminate and limit the duty cycle to a maximum value. Such duty cycle control circuits are well known to those skilled in the art. At the selected point in the cycle of the drive signal, the control signal from circuit 48 goes high and resets latch 45 through gate 51 even if latch 45 is still set and has not been reset by comparator 52.

Controller 30 also includes an overload circuit 50 that assists in preventing overloads on the output of system 10 from damaging the elements of system 10. Circuit 50 is configured to inhibit forming the drive signal responsively to the power required by the load being no less than a first value for a first time interval. Circuit 50 generally is configured to form a first duration of the first time interval responsively to the power required by the load and preferably inversely proportional to the power. The exemplary embodiment of circuit 50 includes an input 53, an amplifier 54, a comparator 55, a reference generator or Ref 56, a logic circuit implemented as an OR gate 58, a first timer circuit 59, and a second timer circuit or timer 57. Input 53 is coupled to receive an overload sense signal that can be used to detect the overload condition. In the preferred embodiment, circuit 50 is configured to detect a power overload, thus, the overload sense signal received on input 53 is the feedback signal. The exemplary embodiment of circuit 59 includes a variable current source 60, a capacitor 61, a discharge transistor 62, a reference generator or Ref 65, and a comparator 64. However, those skilled in the art will appreciate that circuit 59 may have other embodiments as long as the functionality of circuit 59 described hereinafter is preserved. For example, circuit 50 may be configured to sense a current signal in order to prevent a current overload, or even may be configured to receive an input from a mechanical sensor to prevent mechanical movements from putting a system in an overload condition. For these other embodiments, the appropriate sense signal is received on input 53. A FB signal from a feedback network such as network 20 may still be received in on input 37 separately from the signal received on input 53.

Figure 2:
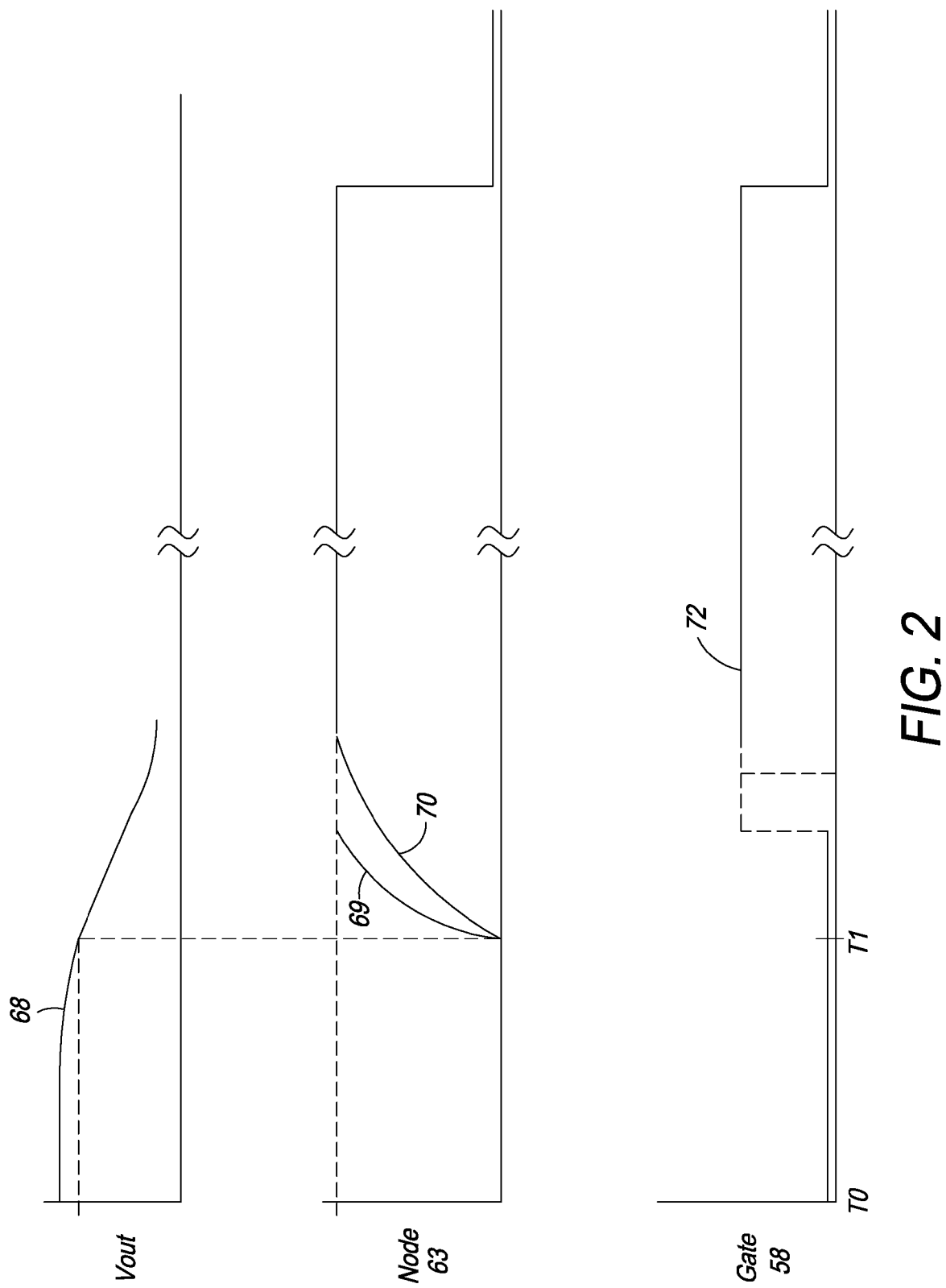
FIG. 2 is a graph having plots that illustrate some of the signals of the system of FIG. 1 in accordance with the present invention.

FIG. 2 is a graph having plots that illustrate some of the signals of system 10. The abscissa indicates time and the ordinate indicates increasing value of the illustrated signal. A plot 68 illustrates the output voltage between terminal 17 and return 18. A plot 69 illustrates the signal on a node 63 of circuit 59 according to one output voltage value and a plot 70 illustrates the signal on node 63 according to another output voltage value. A plot 72 illustrates the output of gate 58. This description has references to both FIG. 1 and FIG. 2.

As long as the value of the output voltage remains within the desired value range, controller 30 continues to operate as described herein before. If the power required by the load (not shown) connected between terminal 17 and return 18 increases to a large value, system 10 may not be able to supply the required power without damaging some of the components of system 10. For example, terminal 17 may be shorted to return 18 either directly or through a resistive element. This situation would require system 10 to supply a large amount of power. If this power is supplied for an extended time period, transistor 21 may be damaged. In order to prevent such damage, controller 30 is configured to monitor the value of the power supplied to the load. If the power increases past a set value and remains no less than the set value for a first time interval, controller 30 is configured to terminate supply power to the load.

As is well known to those skilled in the art, the value of the output voltage can be indicative of the power required by the load. If the power dissipated by the load is larger that the power that can be supplied by system 10 while maintaining the output voltage within the desired value range, the output voltage generally decreases. Thus, if the output voltage decreases to no greater than a first value, it can be assumed that the power required by the load is greater than the rated power for system 10. As the output voltage decreases, the value of the FB voltage increases. If the value of the output voltage decreases to the first value that causes the FB signal to increase to a value that is no greater than the signal from Ref 56, the output of comparator 55 goes low. The low from comparator 55 initiates timer circuit 59 to begin forming a first time interval and also initiates timer 57 to begin forming a second time interval. The low from comparator 55 disables transistor 62 so that variable current source 60 may begin charging capacitor 61. The value of the current supplied by source 60 is proportional to the value of the output voltage, and preferably is inversely proportional to the power required by the load of system 10. Amplifier 54 receives the FB signal and forms a control signal that is proportional to the value of the output voltage and inversely proportional to the output power.

Assume that at a time T1 illustrated in FIG. 2 the power required by the load is much greater than the rated power. This power consumption by the load causes the value of the output voltage to decrease and causes the FB signal to increase which causes the value of the control signal from amplifier 54 to increase. As the control signal increases, the amount of current supplied by source 60 also increases thereby decreasing the amount of time required for capacitor 61 to charge to the value of the signal from Ref 65 as illustrated by plot 69 thereby forming a shorter time interval. As node 63 reaches the value of Ref 65, the output of comparator 64 goes high thereby forcing the output of gate 58 high and resetting latch 45 through gate 51, as illustrated by a first dashed line portion of plot 72. Resetting latch 45 negates the drive signal on output 36 and disables transistor 21. Note that controller 30 continues to form drive signals until the expiration of the first time interval formed by circuit 59. Node 63 remains high and inhibits latch 45 from being set by clock 43 until the power required by the load decreases and causes the output of comparator 55 to go high. Conversely, if the power required by the load at time T1 is less but still greater than the rated power, the value of the output voltage is not as low (closer to the desired output voltage value), the FB signal is lower, and source 60 supplies less current which takes longer to charge capacitor 61 to the signal from Ref 65 thereby forming a longer time interval as illustrated by plot 70 and a second dashed line portion of plot 72. Thus, the time interval formed by circuit 59 once the output voltage decreases to the first value is proportional to the value of the output voltage and inversely proportional to the power required by the load.

If the amount of power required by the load is small but still greater than the rated power, the time interval formed by circuit 59 may be very long. In order to ensure that system 10 only supplies the increased power for a limited amount of time, timer 57 is configured to form a substantially fixed time interval. If the time interval formed by circuit 59 is greater than the time interval formed by timer 57, the output of timer 57 goes high before comparator 64 goes high. The high from timer 57 forces the output of gate 58 high to reset latch 45 and inhibit forming the drive signal. Thus, timer 57 forms a time interval that is used by circuit 50 to limit the first time interval of circuit 59 to a maximum value and to ensure that controller 30 only supplies the increased power for a maximum time. In one embodiment, the time interval of timer 57 is about one second. Timer 57 may be formed by a variety of implementations and methods including a digital timer that uses clock 43 to digitally form the time interval of timer 57. Additionally, circuit 59 may have a different implementation, such as a digital implementation, and circuit 57 may be formed as a portion of circuit 59, or the value of source 60 may be limited to a minimum value that negates the need for timer 57.

In order to implement this functionality for controller 30, regulator 39 is connected between input 31 and return 32 to receive the input voltage and form the operating voltage on output 40. The output of clock 43 is commonly connected to a set input of latch 45 and an input of circuit 48. An output of circuit 48 is connected to a first input of gate 51. An output of gate 51 is connected to a reset input of latch 45. A Q output of latch 45 is connected to an input of buffer 46 which has an output connected to output 36. A non-inverting input of comparator 52 is commonly connected to first terminal of resistor 53, input 37, an input of amplifier 54, and an inverting input of comparator 55. An inverting input of comparator 52 is connected to input 38. An output of comparator 52 is connected to a second input of gate 51. The output of amplifier 54 is connected to a control input of current source 60. A non-inverting input of comparator 55 is connected to the output of ref 56. The output of comparator 55 is commonly connected to the input of timer 57 and to a gate of transistor 62. A source of transistor 62 is commonly connected to a first terminal of capacitor 61 and return 32. A drain of transistor 62 is commonly connected to the second terminal of capacitor 61, node 63, a first terminal of source 60, and a non-inverting input of comparator 64. A second terminal of source 60 is connected to output 40. An inverting input of comparator 64 is connected to the output of ref 65. The output of comparator 64 is connected to a first input of gate 58 which has an output connected to a third input of gate 51. The output of timer 57 is connected to a second input of gate 58.

Figure 3:
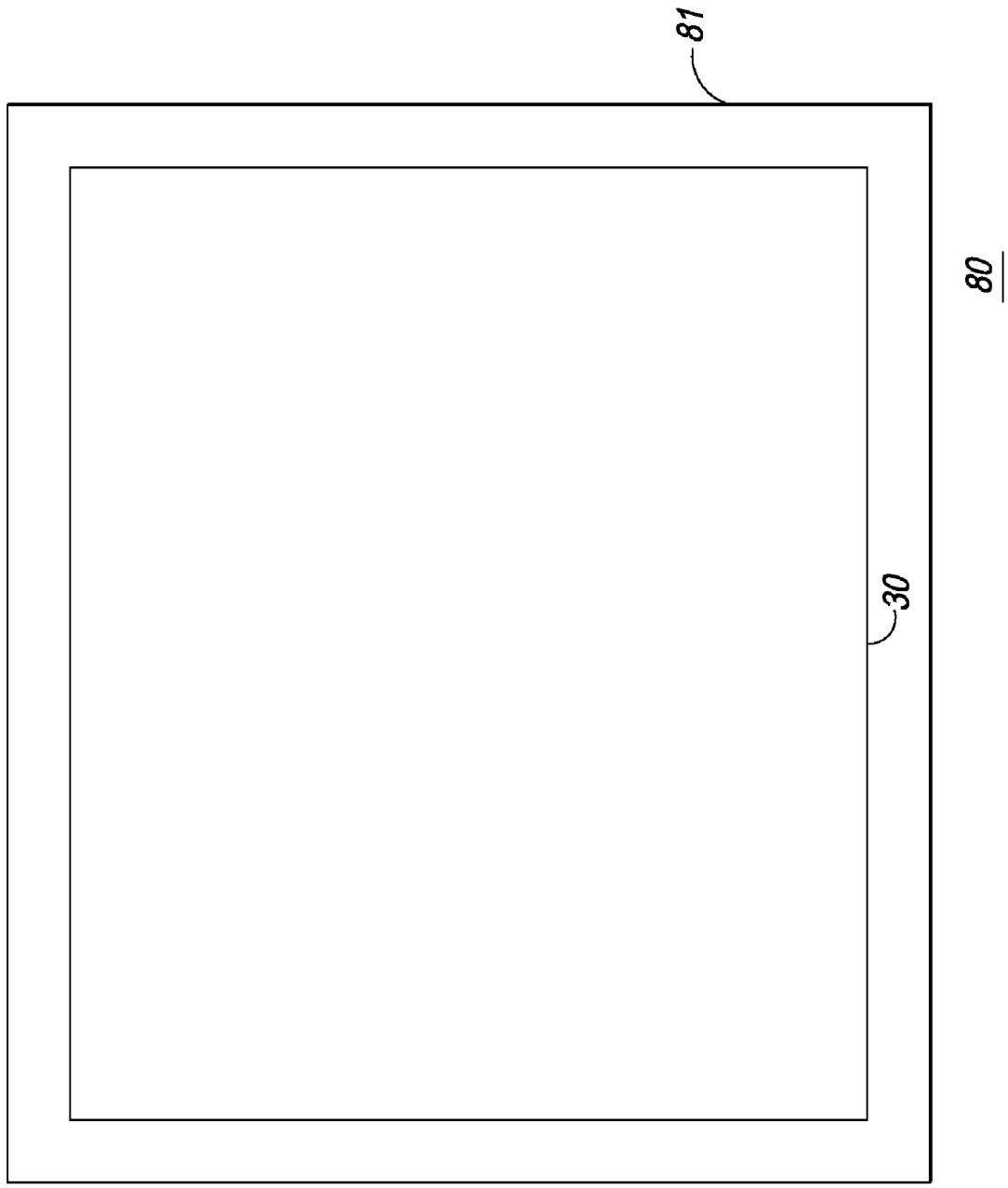
FIG. 3 schematically illustrates an enlarged plan view of a semiconductor device that includes the pulse width modulated (PWM) power supply controller of FIG. 1 in accordance with the present invention.

FIG. 3 schematically illustrates an enlarged plan view of a portion of an embodiment of a semiconductor device or integrated circuit 80 that is formed on a semiconductor die 81. Controller 30 is formed on die 81. Die 81 may also include other circuits that are not shown in FIG. 3 for simplicity of the drawing. Controller 30 and device or integrated circuit 80 are formed on die 81 by semiconductor manufacturing techniques that are well known to those skilled in the art.

In view of all of the above, it is evident that a novel device and method is disclosed. Included, among other features, is forming a PWM controller to inhibit forming the drive signal responsively to the power delivered to the load remaining no less than a first value for a first time interval wherein the first time interval is formed to be inversely proportional to power supplied to a load. Inhibiting the drive signal prevents damaging the circuits of the system. Using the value of the output voltage to determine the first value of the power simplifies the circuits needed to determine the power level. Varying the duration of time interval based on the amount of power required by the load allows the controller to handle peak loads and only supply power for a short duration and to also handle small overloads and supply a smaller amount of power for longer periods of time. This makes the circuit more flexible and improves the operation of the system that uses the controller.

While the subject matter of the invention is described with specific exemplary and preferred embodiments, it is evident that many alternatives and variations will be apparent to those skilled in the semiconductor arts. For example, circuit 59 is illustrated with a specific embodiment but those skilled in the art will appreciate that other embodiments are possible as long as the embodiment provides the function of circuit 59. Various circuit configurations may be used to form timer 57. Also, system 10 is illustrated as a buck voltage converter, however, circuit 50 may be used in other power supply configurations. The CS signal is illustrated as being formed by current flow through resistor 22, but it can be formed by a variety of well-known methods. The PWM generation section that includes clock 43 and latch 45 can have a variety of implementations including using a variable frequency clock, or even eliminating the clock and using a hysteretic control loop. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A PWM controller comprising:
a first circuit configured to provide a drive signal used to regulate a value of an output voltage to a desired value;
a second circuit operably coupled to receive a feedback signal that is representative of the value of the output voltage; and
a third circuit operably coupled to receive the feedback signal and to disable the drive signal responsively to the output voltage remaining no greater than a first value for a first time interval wherein the third circuit forms the first time interval to be inversely proportional to power supplied to a load, the third circuit configured to initiate forming the first time interval responsively to the output voltage being no greater than the first value, the third circuit also configured to form a fixed time interval responsively to the first value of the output voltage and to disable the drive signal responsively to first time interval being no less than the fixed time interval.

2. The PWM controller of claim 1 wherein the third circuit is configured to use the output voltage to form a first duration of the first time interval to be proportional to the value of the output voltage.

3. The PWM controller of claim 1 wherein the third circuit is configured to charge a capacitor at a rate that is proportional to the value of the output voltage.

4. The PWM controller of claim 1 wherein the third circuit includes a first digital time circuit including a digital timer that uses a clock to digitally form the first time interval.

5. The PWM controller of claim 1 wherein the third circuit includes a comparator coupled to compare the feedback signal to a reference signal that is representative of the first value.

6. The PWM controller of claim 1 wherein the third circuit includes a variable current source configured to form a current to charge a capacitor wherein the third circuit is configured to vary a value of the current proportional to the power supplied to the load.

7. The PWM controller of claim 6 wherein the third circuit is configured to form the current to charge the capacitor responsively to the first value of the output voltage; and
further including a second timer configured to form the fixed time interval.

8. A method of forming a PWM controller comprising:
configuring the PWM controller to form a drive signal used to regulate an output voltage to a desired value; and configuring the PWM controller to inhibit forming the drive signal responsively to the output voltage having a value that is no greater than a first value for a first time interval and to form a first duration of the first time interval proportional to a value of the output voltage and also including configuring the PWM controller to initiate forming a fixed time interval responsively to the first value of the output voltage and to disable the drive signal responsively to the first time interval being no less than the fixed time interval.

9. The method of claim 8 wherein configuring the PWM controller to inhibit forming the drive signal includes configuring the PWM controller to form the first duration of the first time interval inversely proportional to an overload sense signal.

10. The method of claim 9 further including configuring the PWM controller to initiate forming the first time interval responsively to the first value of the output voltage.

11. The method of claim 8 further including configuring the PWM controller to initiate forming the fixed time interval responsively to the first value of the output voltage.

12. The method of claim 8 wherein configuring the PWM controller to inhibit forming the drive signal includes configuring the PWM controller to inhibit forming the drive signal responsively to the output voltage.

13. The method of claim 8 wherein configuring the PWM controller to inhibit forming the drive signal includes configuring the PWM controller to vary the first time interval inversely proportional to a value of an overload sense signal.

14. A method of forming a PWM controller comprising:
configuring the PWM controller to form a drive signal used to regulate an output voltage to a desired value; and
configuring the PWM controller to inhibit forming the drive signal responsively to the output voltage having a value that remains no greater than a first value for a first time interval and to form a first duration of the first time interval inversely proportional to a value of power supplied to a load and also including configuring the PWM controller to form a fixed time interval responsively to the first value of the output voltage and to disable the drive signal responsively to the first time interval being no less than the fixed time interval.

15. The method of claim 14 further including configuring the PWM controller to limit the first time interval to a maximum value.

16. The method of claim 15 further including configuring the PWM controller to inhibit the drive signal responsively to the first time interval becoming the maximum value.

17. The method of claim 14 wherein configuring the PWM controller to inhibit forming the drive signal includes configuring the PWM controller to vary the duration of the first time interval proportional to a value of the output voltage.

* * * * *